Figure 1:
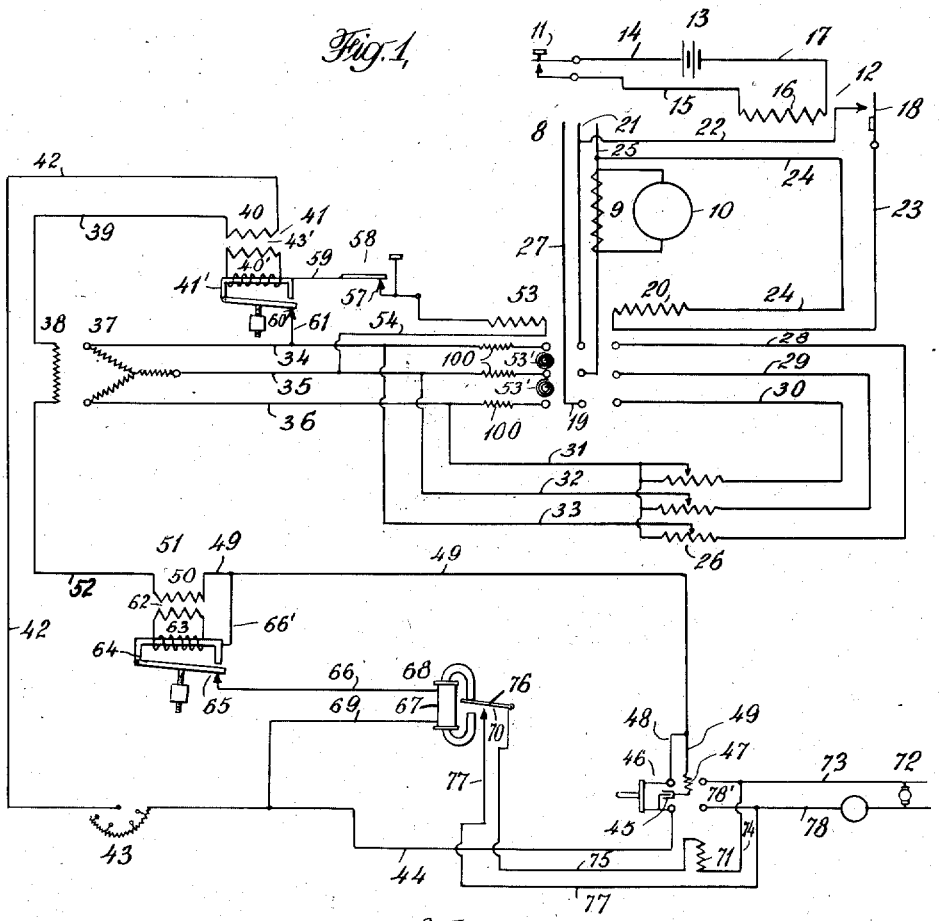

Jan. 1, 1929. Re. 17,180

C. T. HIBBARD

METHOD AND MEANS FOR STARTING SYNCHRONOUS MOTORS

Original Filed Jan. 17, 1920

INVENTOR
Charles Truman Hibbard
BY
Cornelius Vans Warren & Edmonds
ATTORNEY

Reissued Jan. 1, 1929.

Re. 17,180

UNITED STATES PATENT OFFICE.

CHARLES TRUMAN HIBBARD, OF MINNEAPOLIS, MINNESOTA, ASSIGNOR, BY MESNE ASSIGNMENTS, TO ELECTRIC MACHINERY MFG. COMPANY, OF MINNEAPOLIS, MINNESOTA, A CORPORATION OF MINNESOTA.

METHOD AND MEANS FOR STARTING SYNCHRONOUS MOTORS.

Original No. 1,640,322, dated August 23, 1927, Serial No. 352,159, filed January 17, 1920. Application for reissue filed November 8, 1928. Serial No. 318,059.

One object of my invention is to provide a method and means for starting synchronous motors from the actuation of a push button.

Another object is to provide a method and means whereby the motor is started automatically at a reduced voltage and with no excitation current, and whereby when the motor has attained a predetermined percentage of synchronous speed, the full voltage will be applied to the motor, and thereafter the field will be automatically excited.

Another object is to provide improved means and method for automatically exciting the motor field as the motor approaches synchronism.

Another object is to provide a method and means whereby the field will possess the correct polarity when the field circuit is closed.

With these and incidental objects in view, the invention consists of certain novel features of construction and combination of parts, the essential elements of which are hereinafter described with reference to the drawing which accompanies and forms a part of this specification.

Figure 2:
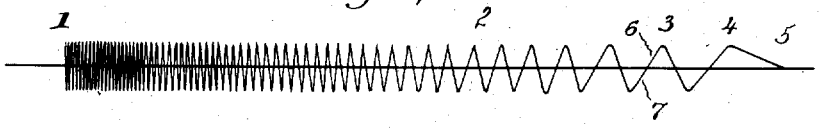

In the drawing, Figure 1 is a schematic view of a circuit showing one embodiment of my invention; and Figure 2 is a conventional representation of an oscillogram showing the current induced in the field winding as the motor is started.

In the ordinary method for starting synchronous motors it is customary to throw a switch which will connect the motor with a tap from the transformer so as to start the motor at a reduced voltage and with no excitation.

When the motor has attained a certain speed a switch is thrown so as to bring a full voltage on the motor and then when the motor has practically reached synchronism, the field is closed and the motor pulls into synchronism.

One of the problems of the handling of synchronous motors, and especially by unskilled help, has been to devise means whereby the full voltage will be thrown onto the motor at the proper time, and another still more important problem has been to devise means whereby the field excitation current may be thrown on at the proper time during the period required for the motor to attain synchronous speed.

Inasmuch as the time required for the motor to attain synchronous speed will vary under load conditions, it is evident that no predetermined interval can be used for either applying the full voltage to the motor, or more especially, for applying the excitation current at the right instant.

It is also apparent that if the field is of the wrong polarity when the field circuit is closed there will be a surge in the line current and the motor will also be subjected to heavy mechanical strains, so the proposition that the field circuit is closed will be accepted by everyone skilled in the art.

So far as I am aware, there have been no feasible, automatic means proposed for automatically starting a synchronous motor to meet the necessary requirements, and to the best of my knowledge, no practical means whatever has been suggested for automatically securing the correct polarity at the instant the field is closed.

When the voltage from the low tap of the transformer is thrown onto the motor a current is induced in the field winding and this current is maintained when the full voltage is applied and continues at substantially its full value until the motor is within a few per cent of synchronous speed.

This field current is, of course, alternating, and like the field voltage, has a frequency equal to the slip, decreasing from a maximum frequency equal to that of the supply current, until it reaches zero when the motor is in synchronism.

As shown in the oscillogram in Figure 2, when the motor is first started the current has a frequency at the point 1 equal to that of the supply current; at the point 2 the frequency has decreased greatly, while at the point 3 the frequency is extremely slow, and from the point 4 to the point 5 the current dies away and at the point 5 it is zero, this representing the instant at which the motor reaches synchronism.

In my method I utilize this induced field current to determine, first, the point at which the full line voltage should be thrown onto the motor; second, to determine positively the point at which the excitation current should be applied; and third, I utilize it in positively supplying the excitation current to the field winding in the proper direction.

While it is admittedly impossible to determine from any outside appearance or action of the motor the instant at which the field current should be applied, it is nevertheless true that in this induced field current we have a means at hand which indicates in itself the time at which the field excitation current should be applied, and, also the time of the cycle at which the application must be made in order that the excitation will be in the proper direction to cause the motor to pull into synchronism.

Obviously, this induced field current also furnishes the best possible means for determining at what instant the full voltage should be applied to the motor as the field current is at all times in definite timed relation with the speed of the motor and the frequency of the supply current.

Inasmuch as the frequencies at the point 2, Figure 2, is greatly reduced below that at the point 1, it is evident that electrical means can be devised that will operate at frequencies such as that represented at point 2, and will not operate at frequencies such as that represented at the point 1.

It is also evident that there is a sufficient difference in frequencies between the points 2 and 3 to allow the use of an electrical device that can be adjusted to function in a certain way under influence of frequencies such as that represented at 3 and not to function in the same manner under influence of frequencies such as that represented at the point 2.

It is also obvious that an electrical device can be constructed that will actuate for instance, when this current is above the line, as at 6, but will not actuate when the current is below the line, as at 7, so that the device being actuated by the electrical condition of this induced current, both as to frequencies and direction of pulsation, will necessarily apply the full voltage at the proper time, close the field current at the proper time to lift the motor into synchronism, and without regard to the length of time that has elapsed from the point 1 to the point 2, at which point the full voltage might be applied, or from the point 1 to the point 3, at which time application of the field excitation current might be made.

In other words, either the application of the full voltage or the application of the field excitation current, or both, may be made to depend absolutely and entirely upon the internal electrical condition of the field winding itself, through the action of this induced current.

In the circuit shown in Figure 1, I have indicated one means by which this may be accomplished and in this circuit the power lines are represented at 8 with the usual transformer 9 and ammeter 10.

In starting the motor the attendant has only to close the circuit by means of the push button 11 and the motor is brought into synchronism in the proper manner, automatically and without further attention or care on the part of the attendant, who may be at a point distant from the motor and not even see the motor at the time he closes the push button circuit. The push button 11 may be actuated by an automatic device not requiring the attention of the operator and at a remote point, such for instance as a float switch in a water tank or a pressure gauge on a gas tank.

The operation of the push button 11 actuates a relay or contactor switch 12, the circuit being as follows: Source of current supply 13, wire 14, push button 11, wire 15, winding 16, and wire 17, to the other side of the source of current supply.

Upon the closing of the contact 18 a switch 19 is thrown to the right, as shown in the sketch, by the actuation of the coil 20, circuit being as follows: Power wire 21, wire 22, contact 18, wire 23, coil 20, wire 24, to power wire 25.

The switch, when thrown to the right, remains in that position until withdrawn, but the coil 20 is energized only so long as the contact 18 remains closed.

The closing of the switch to the right applies a full voltage of the line to the transformer 26, the circuit being as follows: Power lines 25, 21 and 27, switch 19, wires 28, 29 and 30, to the transformer 26.

From the low voltage taps the current is applied to the motor, the circuit being as follows: Wires 31, 32, 33, wires 34, 35, 36, to the stator 37 of the motor.

As soon as the current is applied to the stator current is induced in the rotor 38 through the following circuit: Rotor 38, wire 39, primary 40 of the transformer 41, wire 42, field rheostat 43, wire 44, contact 45 of the switch 46, field discharge resistance 47, wire 49, primary 50 of the transformer 51, wire 52, to the other side of the rotor or field 38.

When the motor is first supplied with the current a circuit is established through the actuating coil 53 of the switch 19, the circuit being as follows: Wire 35, wire 54, coil 53, contact 57 of the push button 58, wire 59, through the frame of the relay 41′, contact 60 and wire 61 to the wire 34.

While the coil 53 is energized, at least partially, by this circuit, the switch 19 is not thrown to the left by the actuation of the coil 53 as the contact 60 in the circuit energizing the coil 53 is broken by the energizing of the coil 40′ before the coil 53 can affect the position of the switch 19. The relay 41′ is energized by the current from the transformer 41 as the secondary 43′ is directly connected to the winding 40′ of the relay 41′.

The frequency relay 41′ is adjustable and is set to release its armature when the frequency of its actuating current falls below a predetermined amount, for instance, that indicated at point 2, Figure 2, the relay being such that it will quickly respond to a frequency such as that indicated at 1, Figure 2, and release under the lower frequency as indicated.

It is evident therefor, that when the motor has reached a certain predetermined percentage of synchronism such that the induced current in the field winding would have a frequency such as is represented at 2, Figure 2, the frequency relay 41′ will be released and the contact 60 closed and this contact 60 will remain closed under decreasing frequencies.

Upon the closing of the contact 60 the coil 53 is energized and the switch 19 thrown to the left, thus applying full voltage to the motor through the overload relays 100.

In the field circuit already traced is included the primary 50 of the transformer 51 and the secondary 62 of this transformer is connected directly to the winding 63 of the frequency relay 64, which is adjustable and is so adjusted that it will be actuated by a current of frequencies higher than that represented at the point 2, Figure 2, for instance, and will release at a frequency such as that represented at 3, Figure 2.

The frequency relay 51 was actuated and its armature drawn up and contact 65 opened at the same instant that frequency relay 41′ was actuated, and when its armature is released as the motor approaches synchronism and at such a point that the frequency of the induced field winding is represented at 3, Figure 2, a circuit is established as follows: field winding 38, wire 52 primary, winding 50 of the transformer 51, wire 49, wire 66′, frame of the relay 64, contact 65, wire 66, winding 67 of the polarized relay 68, wire 69, wire 44, rheostat 43, wire 42, primary winding 40′ of the transformer 41 and wire 39 back to the field winding 38.

Inasmuch as the relay 68 is polarized preferably by a permanent magnet, it is evident it will respond to pulsations of current of one direction only and the contact 70 will be closed only when the polarity of the current passing through the relay is of proper sign such, for instance, as that at 6, Figure 2, and that the contact 70 will be opened when the current is of the opposite polarity, as at 7, Figure 2.

The closing of the contact 70 energizes the coil 71, the circuit being as follows: source of field excitation current at 72, wire 73, wire 74, coil 71, wire 75, armature 76 of the relay 68, contact 70, wire 77, wire 78, to the other side of the source of current supply.

The energizing of the coil 71 throws the switch 46 to the right, applying the field current to the field winding 38 and cutting out the field discharge resistance 47, the field excitation current circuit being as follows: source of current supply 72, wire 73, switch 46, wire 48, wire 49, primary 50 of the transformer 51, wire 52, field winding 38, wire 39, primary 40 of the transformer 41, wire 42, rheostat 43, wire 44, switch 46, wires 78′, 78, to the other side of the source of current supply.

As explained above, the field circuit includes the primary 40 of the transformer 41 and the primary 50 of the transformer 51. These primary transformer windings constitute a reactance connected in the field circuit at all time. The secondary winding 43′ of transformer 41 and the secondary winding 62 of transformer 51 constitute a reactance which may be said to be included in the field circuit when the field circuit carries an alternating current, for in this event a current induced from the primary transformer windings in the field circuit flows through the secondary windings of these transformers. In like manner the relays 41′ and 64 may be regarded as included in the field circuit when the field winding carries an alternating current.

Inasmuch as the field was excited by means of the magnetizing switch at a predetermined condition of the cycle of the induced field current, it is evident that the excitation current would always be applied in the proper direction to lift the motor directly into synchronism.

The frequency relays, as shown in the drawing, are representative of any type of relay or device that will function in one manner under the influence of a current of a certain frequency and be disposed in a different manner under the influence of a current of a lower frequency, and any device that will so function may be used as a frequency relay in my method.

The polarized relay is shown in the drawing as a conventional representation of a polarized relay and the magnetically operated switches are shown as conventional representations of switches whose operation is well known to all those skilled in the art, and while shown conventionally, I wish it understood that they represent operative devices, as I will claim under this patent not only the method of starting synchronous motors but also the means for so doing, said means being a new combination of well known devices producing a new effect. As stated above, the frequency relay 64 is adapted to open the contact 65 when the frequency of the induced field current is higher than that represented at the point 2, Fig. 2, for instance, and to close this contact when the frequency is such as that represented at 3, Fig. 2. Therefore, if the motor pulls out of step for any reason and the frequency of the induced field current increases beyond the point 2, Fig. 2, for instance, the relay 64 will operate to break the circuit including coil 71 of the field switch 46, thus permitting this switch to open and thereby disconnect the field winding from the source of excitation current.

Under ordinary conditions I would so adjust the frequency relay 41′ as to impress the full voltage on the motor when approximately seventy per cent of synchronous speed has been attained, and so time or adjust the frequency relay 64 that the field would be closed at approximately ninety per cent of synchronous speed.

One of the main benefits of my system, however, is that the adjustments may be made on the relays to meet the operating conditions of any particular motor, so that when the motor is started by the pressing of the push button 11 the motor will be brought up to synchronism under the best possible conditions for that motor for the particular load which it is handling.

The winding of the frequency relay 64 is energized by the secondary current of transformer 51 so the action of closing the magnetic gap when the armature of the relay is drawn up will choke the secondary current and thereby make the armature more easily released when the frequency of the induced current in the field winding falls below the point 2.

While from the nature of the method and means disclosed it is evident that the operation will be positive in nature, yet, if for any reason the frequency relay 64 failed to operate between the points 3 and 5, it would necessarily operate at the point 5, as there would be no induced current whatever in the field winding at that time; hence the polarized relay 68 would, in any event, be actuated so that even in case of failure of operation of the frequency relay the field current would be thrown in.

The push button 58 may be located at a distant point from the motor and there may be a number of such buttons with their contacts in parallel, so that the coil 53 and the switch 19 would be energized upon actuating any one of these push buttons. This would allow the throw-out springs 53′ to open the switch 19, thus disconnecting the motor from the line.

I have described my invention as applied to a polyphase synchronous motor but it will be understood that the invention can be used to good advantage with synchronous machines of various types such as rotary converters and alternators.

While I have described my invention as including means for applying full voltage and subsequently closing the field circuit, yet it is to be understood that my invention can be applied to synchronous machines where it is desired to close the field circuit prior to the application of the full voltage to the armature winding.

While I have shown one style of frequency relay and one style of polarized relay and a certain conventional circuit, it is apparent that this invention covers broadly any method or means controlling any part or all of the starting of a synchronous motor through a means controlled by the internal electrical condition of the field winding, and covers broadly any method or means by which the right polarity may be secured at the instant the field is closed.

The overload relays 100 are connected in the supply circuit in such a manner that the line current does not pass through these relays during the period when reduced voltage is impressed on the motor armature. This arrangement prevents the overload relays 100 from operating during the first part of the starting period when the line current is excessive.

While this invention has been described as applied to its use with a synchronous motor of the type which is started by first applying reduced voltage, yet the motor starting system may be applied to synchronous motors of the full voltage type, i. e. synchronous motors which may be started by impressing line voltage directly on the armature.

I claim:

1. In a system of the type described, the combination with a motor having a field winding, of a source of excitation for the field winding, automatic means responsive to the electrical condition of the field winding for supplying excitation current to the field winding of the motor when it has reached a predetermined speed, said means being adapted to open the field circuit when the motor speed falls below a predetermined speed.

2. In a system of the type described, the combination with a motor having a field winding, of a source of excitation for the field winding, a switch for connecting the field winding to the source of excitation, and means responsive to the electrical condition of the field winding for closing said switch when the motor speed increases to a predetermined value and for opening said switch when the motor speed falls below a certain speed near synchronous speed.

3. In a system of the type described, the combination with a motor having a field winding and an armature winding, of means for applying voltage to the armature winding, a switch for connecting the field winding of the motor to a source of excitation current, and means responsive to the electrical condition of the main field winding for closing said switch when the motor speed increases to a predetermined value and for opening said switch when the motor speed falls below a certain value.

4. In a system of the type described, the combination with a motor having an armature winding and a field winding, of means for applying voltage to the armature winding, automatic means responsive to the electrical condition of the field winding for supplying excitation current to the field winding when the motor has reached a predetermined speed, said automatic means being adapted to open the field circuit when the motor speed falls below a predetermined value.

5. In a system of the type described, the combination with a motor having an armature and field winding, of a source of excitation for the field winding, means for applying voltage to the armature of the motor, and automatic means associated with the motor for supplying excitation current to the field winding when the motor has reached a predetermined speed and for opening the field circuit when the motor speed falls below a certain value, said automatic means being exclusively responsive to the slip frequency of the current induced in the main field winding of the motor.

6. In a system of the type described, the combination with a motor having a secondary winding, of a source of direct current, a resistance, means arranged to short circuit the secondary winding through said resistance when the motor is starting, a switch for connecting said winding to the source of direct current, and means responsive to the electrical condition of said winding for simultaneously opening the short circuit through said resistance and closing said switch when the motor has reached a predetermined speed and for opening said switch when the motor speed falls below a certain speed.

7. In a system of the type described, the combination with a motor having an armature winding and a field winding, of means for applying voltage to the armature winding, a source of direct current, a resistance, means arranged to short circuit the field winding of the motor thru said resistance when the motor is started, a switch for connecting said winding to the source of direct current, and means responsive to the electrical condition of said field winding for simultaneously opening the short circuit thru said resistance and closing said switch when the motor has reached a predetermined speed and for opening said switch when the motor speed falls below a certain value.

8. In a system of the type described, the combination with a motor having an armature winding and a field winding, of means for applying voltage to the armature winding, a source of direct current, a resistance, a two-position switch arranged so that in one position it connects said resistance across the field winding and in the other position it connects the source of direct current to the field winding, and means responsive to the electrical condition of said field winding for operating said switch to disconnect said resistance from the field winding and to connect the source of direct current to the field winding when the motor has reached a predetermined speed.

9. In a system of the type described, the combination with a motor having an armature winding and a field winding, of means for applying voltage to the armature winding, a source of direct current, a resistance, a two-position switch arranged so that in one position it connects said resistance across the field winding and in the other position it connects the source of direct current to the field winding, and means responsive to the electrical condition of said field winding for operating said switch to disconnect said resistance from the field winding to connect the source of direct current to the field winding when the motor has reached a predetermined speed, and to disconnect the source of direct current from the field winding and connect the resistance thereto when the motor speed falls below a certain value.

10. In means for starting a synchronous motor the combination with the field winding of said motor, of a frequency relay, a polarized relay, and a source of field excitation current, and an electrical circuit connecting said devices whereby current may be supplied to said field winding when the frequency of the induced current therein is below a certain value and the cycle thereof is of a certain direction of pulsation.

11. In a system of the type described, the combination with a motor having an armature and a field winding, of a source of excitation for the field winding, means for applying voltage to the armature of the motor, and automatic means associated with the motor for supplying excitation current to the field winding when the motor has reached a predetermined speed, said automatic means comprising a field switch and a polarized frequency relay responsive to the frequency of the induced current in the main field winding, said relay being connected in circuit with said field winding at all times.

12. In a system of the type described, the combination with a motor having a field winding and an armature winding, of means for applying voltage to the armature winding, and automatic means associated with the motor for supplying excitation current to the field winding when the motor has reached a predetermined speed, said automatic means comprising a field switch and a polarized frequency relay responsive to the frequency of the induced current in the main field winding, said relay being in operative connection with said field winding at all times.

13. In a system of the type described, the combination with a motor having an armature winding and a field winding, of means for applying voltage to the armature of the motor, and automatic means responsive to the electrical condition of the field winding for supplying excitation current to the field winding when the motor has reached a predetermined speed, said automatic means being inoperable until voltage has been applied to the armature, and said automatic means being adapted to open the field circuit when the motor speed falls below a predetermined value.

14. In a system of the type described, the combination with a motor having an armature and a field winding, of a source of excitation for the field winding, means including a switch for applying voltage to the armature of the motor, and automatic means responsive to the electrical condition of the field winding for supplying excitation current to the field winding of the motor when the motor has reached a predetermined speed, said automatic means being inoperable until voltage has been applied to the armature, and said automatic means being adapted to open the field circuit when the motor speed falls below the predetermined speed.

15. In a system of the type described, the combination with a motor having an armature winding and a field winding, of means for applying voltage to the armature of the motor, said means including a switch controlled circuit and an electromagnetic switch having a coil energized by said circuit, and automatic means responsive to the electrical condition of the field winding for supplying excitation current to the field winding when the motor has reached a predetermined speed, said automatic means being inoperable until voltage has been applied to the armature, and said automatic means being adapted to open the field circuit when the motor speed falls below a predetermined value.

16. In a system of the type described, the combination with a motor having a field winding of a reactance connected in the field circuit, a frequency relay having a magnetizing coil connected across the reactance, and a field switch adapted to be closed by said relay when the frequency of the induced current in the field winding has decreased to a predetermined value, the reactance being connected in said field circuit at all times.

17. In a system of the type described, the combination with a motor having a field winding of a source of excitation for the field winding, a reactance connected in series with the field winding of the motor, a resistance connected across the field winding and the reactance during the starting of the motor, a frequency relay connected across said reactance and responsive to the frequency of the induced current in the field winding and a switch operable by said frequency relay to supply excitation current to the field winding when the frequency of the induced current has decreased to a predetermined value, said switch having means for opening the circuit of the resistance connected to the field winding and the reactance without disconnecting the reactance from the field circuit.

18. The combination with a synchronous motor, of means comprising electro-responsive switches for establishing starting and running power connections therefor, control means for said switches insuring establishment of said starting connections prior to establishment of said running connections and establishment of running connections upon interruption of starting connections, said means including a normally closed electro-responsive relay to be included in the field circuit of said motor and a reactance to be included in the field circuit of said motor.

19. The combination with a synchronous motor, of means comprising electro-responsive switches for establishing starting and running power connections therefor, control means for said switches insuring establishment of said starting connections prior to establishment of said running connections and establishment of running connections upon interruption of starting connections, said means including a normally closed electro-responsive relay to be included in the field circuit of said motor and a reactance to be included in the field circuit of said motor to render said relay responsive to a given voltage which is a function of the speed of said motor.

20. The combination with a synchronous motor, of means comprising electro-responsive switches for establishing reduced voltage armature connections for starting and full voltage armature connections for running, an electro-responsive switch for connecting the motor field to a source of direct current, and control means for the aforesaid switches including a plurality of electro-magnetic timing relays included in the field circuit of said motor during starting and responsive to the slip of the motor, one of said relays controlling said first mentioned switches and the other controlling said last mentioned switch.

21. The combination with a synchronous motor, of means comprising electro-responsive switches for establishing reduced voltage armature connections for starting and full voltage armature connections for running, an electro-responsive switch for connecting the motor field to a source of direct current, and control means for the aforesaid switches including a plurality of electro-magnetic timing relays included in the field circuit of said motor during starting and subjected to voltage which is a function of the speed of said motor, one of said relays controlling said first mentioned switches and the other controlling said last mentioned switch.

22. The combination with a synchronous motor, of means comprising electro-responsive switches for establishing reduced voltage armature connections for starting and high voltage armature connections for running, an electro-responsive switch for connecting the motor field to a source of direct current, a reactance normally included in the field circuit of said motor by said latter switch and control means for said switches including a plurality of electro-magnetic relays each having its operating winding connected in shunt with said reactance, one of said relays insuring establishment of said running connections and interruption of said starting connections upon a given speed of said motor and the other insuring closure of said field switch when the speed of said motor approaches synchronism.

23. In a motor control system, the combination with an alternating current motor having a field circuit that is energized by the motor when the latter operates below synchronous speed and means for establishing starting and running primary connections for said motor, of means for controlling the establishing of said running connection in accordance with the value of the current traversing said field circuit.

24. The starting system for synchronous motors, comprising the combination with a motor of means including a switch for applying reduced voltage to the armature and means normally connected to the main field winding at all times and exclusively responsive to the induced current in the main field winding for automatically applying full voltage to the armature after the motor has attained a predetermined speed.

25. In a motor control system, the combination with a motor having a primary circuit and an exciting circuit and a source of energy, of means for preventing the connection of said source to said primary circuit to apply normal voltage thereto when the current traversing a portion of said exciting circuit exceeds a predetermined value.

26. In a motor control system, the combination with an alternating current motor having a field circuit that is energized by the motor when the latter operates below synchronous speed and means for establishing starting and running primary connections for said motor, of means operable only while the starting connections are maintained for controlling the establishing of said running connection in accordance with the value of the current transversing said field circuit.

27. In a motor control system, the combination with a synchronous motor having a field magnet winding and an armature winding, and switching means for establishing starting and running connections for said armature winding, of means comprising an electro-magnetic switch that is operable only when the current traversing a coil thereof is below a predetermined value for successively effecting the establishing of said starting connections, and the opening of said starting connections and the establishing of said running connections when the alternating current traversing said field-magnet winding falls below a predetermined value.

28. In a motor control system, the combination with a synchronous motor having a field magnet winding, of means for controlling the establishing of starting and running primary connections therefor, said means comprising a switch embodying electromagnetic means for preventing the closing of said switch so long as the current traversing said winding exceeds a predetermined value while the starting connections are maintained.

29. In a system of electrical distribution, a source of alternating current, a synchronous dynamo electric machine adapted to be connected to said source, switching means for controlling the connection of said machine to said source, and means responsive to the slip frequency of said machine for controlling said switching means, the means responsive to the slip frequency of the machine being connected in a closed circuit at all times.

30. The starting system for synchronous motors, comprising the combination with a motor of means including a switch for applying reduced voltage to the armature, and means normally connected to the main field winding at all times and exclusively responsive to the frequency of the induced current in the main field winding for automatically applying full voltage to the armature after the motor has attained a predetermined speed.

31. A starting system for synchronous motors, comprising the combination with a motor of a double throw line switch having one set of terminals connected directly to the motor, a source of reduced voltage connected to another set of terminals of said switch and to said motor, means for closing said switch to connect the line to the source of reduced voltage whereby reduced voltage is applied to the motor, and means normally connected to the main field winding of the motor at all times and exclusively responsive to current induced in the main field winding, for automatically reversing said line switch, whereby full voltage is applied to the motor.

32. A starting system for synchronous motors, comprising the combination with a motor of a double throw line switch having one set of terminals connected directly to the motor, a source of reduced voltage connected to another set of terminals of said switch and to said motor, means for closing said switch to connect the line to the source of reduced voltage whereby reduced voltage is applied to the motor, means normally connected to the main field winding of the motor at all times and directly responsive to current induced in the main field winding, for automatically reversing said line switch, whereby full line voltage is applied to the motor, and means for automatically opening said line switch when said reversing means is inoperative.

33. In means for starting a synchronous motor the combination with a motor of a two-way line switch, electromagnetic means for closing said switch in one direction, a second electromagnetic means for closing said main line switch in the opposite direction, means including circuit closing device for actuating said first named electromagnetic means, and means controlled by the internal electrical condition of the field winding of the motor being started for actuating said second named electromagnetic device, a source of field excitation current and a frequency relay arranged so that field excitation current may be applied to the field winding of the motor when the frequency of the induced current in the field winding falls below a predetermined rate.

34. In means for starting a synchronous motor the combination of a two-way main line switch, an adjustable transformer, electromagnetic means for closing the switch in one direction, a second electromagnetic means for closing the switch in the opposite direction, a push button, means controlled by said push button for energizing said first named electromagnetic means, an electrical circuit connecting the motor to be started to a low voltage tap on said transformer when said switch is thrown in its first named position, means controlled by the internal electrical condition of the field winding of the motor to be started for throwing said switch to its second named position, a source of field excitation current, means for applying said field excitation current to said field winding, said last named means being controlled by means whose operations are determined by the internal electrical condition of the field winding.

35. In a system of the type described, the combination with a motor having an armature and a field winding of means for applying voltage to the armature, a transformer connected in the field circuit, a frequency relay having a magnetizing coil connected across the secondary winding of the transformer and a field switch adapted to be closed by said relay when the frequency of the induced current in the field winding has decreased to a predetermined value, the said transformer being connected in the field circuit at all times.

36. In a system of the type described, the combination with a motor having an armature and a field winding, of means for applying voltage to the armature, a transformer having its primary winding connected in series with the field winding of the motor, a resistance connected across the field winding and the primary winding of the transformer during the starting of the motor, a frequency relay connected across the secondary winding of said transformer and responsive to the frequency of the induced current in the field winding, and a switch controlled by said frequency relay to supply exitation current to the field winding when the frequency of the induced current has decreased to a predetermined value, said switch having means for opening the circuit of the resistance connected to the field winding and the primary winding of the transformer without disconnecting the transformer from the field circuit.

37. The combination with a synchronous electric motor having a primary winding and a field magnet winding, of a circuit including said field magnet winding and means inductively related to said circuit for controlling the circuit of said primary winding.

38. The combination with a synchronous alternating current motor having a primary winding and a field magnet winding, of electromagnetic means for controlling the circuit connections of said primary winding in accordance with current conditions in the circuit of said field magnet winding, said means comprising a relay having a coil in circuit with said winding and a second coil inductively related to the first named coil.

39. In a motor control system, the combination with a synchronous motor having a field magnet winding, of means for controlling the establishing of starting and running primary connections therefor, said means comprising a switch embodying a closing coil and a lockout coil that is energized in accordance with the value of the current traversing said winding, said lockout coil being effectively energized only while the starting connections are maintained.

40. In a motor starter, the combination with a synchronous motor having a field magnet winding, and starting and running connections for said motor, of a switch controlled in accordance with the value of the current traversing said winding for controlling the circuit of said winding, a switch for effecting the transfer from starting connections to running connections and a relay having an actuating coil in circuit with said winding for controlling the second named switch.

41. In a motor control system, the combination with a synchronous motor having a field magnet winding that is self-excited when the motor operates below synchronous speed, separate means for energizing said winding and means for applying voltages of different values to said motor for starting and for normal operation, of means for controlling the value of the voltage applied to said motor and the connection of said winding to said energizing means in accordance with the value of the current traversing said winding.

42. In a motor control system, the combination with an alternating current motor having a field magnet winding and switching mechanism for establishing main starting and running connections for said motor, of means for energizing said winding during normal operation of said motor, and automatic means for effecting the establishing of said running connections and the connection of said winding to said energizing means when the current traversing said winding during the starting operation falls below a predetermined value.

43. In a system of electrical distribution, a source of alternating current, a synchronous dynamo electric machine connected to said source, switching means for controlling the connection of said machine to said source, and means responsive to the slip frequency of said machine for controlling the excitation of said machine and the connection of said machine to said source.

44. In a motor control system, the combination with a motor, a field circuit therefor and means for energizing said circuit, of a source of energy at low voltage for starting said motor and a source of energy at high voltage for normally supplying said motor, and means for preventing the connection of said energizing means to said field circuit and of said motor to said source of energy at high voltage when the current traversing a portion of said field circuit exceeds a predetermined value.

45. In a motor control system, the combination with an alternating current motor having a field magnet winding and switching mechanism for establishing main starting and running connections for said motor, of means for energizing said winding during normal operation of said motor, and automatic means for effecting the establishing of said running connections and the connection of said winding to said energizing means when the current traversing said winding during the starting operation falls below a predetermined value, said automatic means comprising a switch having a coil that is in circuit with said field magnet winding at all times.

46. In a motor control system, the combination with an alternating current motor having a field magnet winding and switching mechanism for establishing main starting and running connections for said motor, of means for energizing said winding during normal operation of said motor, and automatic means for effecting the establishing of said running connections and the connection of said winding to said energizing means when the current traversing said winding during the starting operation falls below a predetermined value, said automatic means comprising a switch having a closing coil and a lockout coil that is in circuit with said field magnet winding at all times.

47. In a motor control system, the combination with a synchronous motor having a field magnet winding that is self-excited when the motor operates below synchronous speed, separate means for energizing said winding and means for applying voltages of different values to said motor for starting and for normal operation, of means for controlling the value of the voltage applied to said motor and the connection of said winding to said energizing means in accordance with the value of the current traversing said winding, said means comprising a switch having a lockout coil in circuit with said field magnet winding.

48. In a motor control system, the combination with a synchronous motor having a field magnet winding that is self-excited when the motor operates below synchronous speed, separate means for energizing said winding and means for applying voltages of different values to said motor for starting and for normal operation, of means for controlling the value of the voltage applied to said motor and the connection of said winding to said energizing means in accordance with the value of the current traversing said winding, said means comprising a switch having a closing coil and a lockout coil that retains said switch in open position so long as said winding is self-excited beyond a predetermined degree.

49. In a motor control system, the combination with a synchronous motor having a field magnet winding that is self-excited when the motor operates below synchronous speed, separate means for energizing said winding and means for applying voltages of different values to said motor for starting and for normal operation, of means for controlling the value of the voltage applied to said motor and the connection of said winding to said energized means in accordance with the electrical condition of said winding.

50. In combination, a source of alternating current, an alternating current dynamo electric machine having an armature winding and field winding, switching means arranged to connect said armature winding to source whereby a low voltage is impressed thereon, switching means arranged to connect said armature winding to said source whereby a high voltage is impressed thereon, means adapted, when operated, to effect the operation of said first mentioned switching means, means arranged to supply direct current to said field winding after the operation of said first mentioned switching means, and means responsive to the current through said field winding to effect the operation of said second mentioned switching means.

51. The method of starting a synchronous motor comprising the application of low voltage to the motor and thereafter applying the full voltage of the supply circuit to the motor at a time when the frequency of the induced field current is a predetermined value and applying the field excitation current to the field winding at a time when the frequency of the induced field current is a predetermined value.

52. The method of starting a synchronous motor which consists in accelerating said motor to synchronous speed by applying voltage to its armature winding while its field magnet winding is short-circuited, opening the circuit of said field magnet winding when the current traversing it is substantially zero, connecting said field magnet winding to a source of energy and applying voltage to the armature winding.

53. The method of starting a synchronous motor comprising the application of low voltage to the motor and thereafter applying the full voltage of the supply circuit to the motor at a time when the induced field current is a predetermined value and applying the field excitation current to the field winding at a time when the frequency of the induced field current is a predetermined value and at the instant of a predetermined direction of pulsation of the said induced field current.

54. The method of starting a synchronous motor comprising the application of a low voltage thereto, thereafter applying the full voltage of the supply circuit to the motor at a time when the frequency of the induced field current is a predetermined value and applying the excitation current to the field winding in such a direction and at such a time as to bring the motor into synchronism.

55. The method of starting a synchronous motor which consists in supplying the motor with a reduced voltage and after the motor has attained a considerable percentage of synchronous speed and the frequency of the induced field current has dropped to a predetermined rate, applying the full voltage of the supply circuit to the motor and when the motor has attained substantially synchronous speed and the frequency of the induced field current is low, applying the field excitation current to the field winding at such an instant with respect to the direction of pulsation of the induced field current that the field excitation current will tend to at once bring the motor into synchronism.

In testimony whereof I affix my signature.

CHARLES TRUMAN HIBBARD.